US009055110B2

(12) United States Patent
El Houmaidi (10) Patent No.: US 9,055,110 B2
(45) Date of Patent: Jun. 9, 2015

(54) MONITORING AND CONTROLLING ELECTRONIC ACTIVITY USING THIRD PARTY RULE SUBMISSION AND VALIDATION

(75) Inventor: Mounire El Houmaidi, Spring Grove, IL (US)

(73) Assignee: AT&T Intellectual Property I, L.P., Atlanta (GA)

( * ) Notice: Subject to any disclaimer, the term of this patent is extended or adjusted under 35 U.S.C. 154(b) by 563 days.

(21) Appl. No.: 13/304,763

(22) Filed: Nov. 28, 2011

(65) Prior Publication Data

US 2013/0139213 A1    May 30, 2013

(51) Int. Cl.
G06F 21/10 (2013.01)
H04L 29/06 (2006.01)
G06F 21/55 (2013.01)

(52) U.S. Cl.
CPC .............. *H04L 63/20* (2013.01); *G06F 21/552* (2013.01); *G06F 2221/2101* (2013.01); *G06F 2221/2115* (2013.01); *G06F 2221/2147* (2013.01); *G06F 2221/2141* (2013.01)

(58) Field of Classification Search
CPC .......... G06F 21/552; G06F 2221/2147; H04L 63/20
USPC .......... 726/11–15, 2–3, 22–25; 713/153–154, 713/187–188, 193–194; 709/206, 246–247, 709/249
See application file for complete search history.

(56) References Cited

U.S. PATENT DOCUMENTS

| | | | | |
|---|---|---|---|---|
| 7,526,792 | B2* | 4/2009 | Ross | 726/2 |
| 8,127,336 | B2* | 2/2012 | Bienek et al. | 726/1 |
| 8,281,361 | B1* | 10/2012 | Schepis et al. | 726/1 |
| 8,281,366 | B1* | 10/2012 | McCorkendale et al. | 726/2 |
| 2002/0116630 | A1* | 8/2002 | Stehlin | 713/200 |
| 2005/0198319 | A1 | 9/2005 | Chan et al. | |
| 2006/0010491 | A1* | 1/2006 | Prigent et al. | 726/11 |
| 2007/0113273 | A1* | 5/2007 | Shafer et al. | 726/11 |
| 2008/0282338 | A1* | 11/2008 | Beer | 726/12 |
| 2008/0320577 | A1 | 12/2008 | Larduinat | |
| 2009/0100513 | A1* | 4/2009 | Coburn | 726/11 |
| 2009/0217342 | A1 | 8/2009 | Nadler | |
| 2010/0235923 | A1* | 9/2010 | Schepis et al. | 726/26 |

OTHER PUBLICATIONS

K9 Web Protection, http://www1.k9webprotection.com/aboutk9/product-features, retrieved Nov. 22, 2011.

* cited by examiner

*Primary Examiner* — Evans Desrosiers
(74) *Attorney, Agent, or Firm* — Hartman & Citrin LLC (57) ABSTRACT

Concepts and technologies are disclosed herein for monitoring and controlling electronic activity. A policy service can be called for policies for controlling electronic activity occurring at one or more managed devices. The policies can include a number of rules, each of which can include a number of variables. The rules can be defined by a manager device and/or received from third parties. Third party rule submissions can be validated. If electronic activity at the managed device deviates from a rule, the manager device can be notified and the electronic activity can be blocked. The manager device can update the policy and/or issue exceptions, if desired.

18 Claims, 6 Drawing Sheets

MONITORING AND CONTROLLING ELECTRONIC ACTIVITY USING THIRD PARTY RULE SUBMISSION AND VALIDATION

BACKGROUND

This application relates generally to electronic activity monitoring and control. More specifically, the disclosure provided herein relates to monitoring and controlling electronic activity using third party rule submission and validation.

Many approaches to online security and/or electronic activity control and monitoring are based upon controlling actions of a device. In these device-based approaches, activities at a device are controlled or monitored by software installed on the device. Thus, users of the devices must comply with the security or activity control mechanisms in place at the device.

Users sometimes use multiple devices to conduct electronic activity. For example, users sometimes interact with online content via smart phones, personal computers, and/or on-demand and Internet television services. Furthermore, users can use multiple smart phones, multiple personal computers, and/or multiple television set-top boxes or units to conduct their online activities. As such, electronic activity associated with users can move from device to device.

Additionally, users are interacting with increasingly diverse content such as video, chat services, instant messages, news feeds, music, and the like. Controlling and/or monitoring these various types of data across various platforms and/or devices can require interactions with multiple specific solutions tailored for each data type and/or device. Furthermore, entities controlling and/or monitoring these activities often create detail security plans for their specific issues, without looking to other sources for guidance.

SUMMARY

The present disclosure is directed to monitoring and controlling electronic activity using third party rule submission and validation. According to some embodiments of the concepts and technologies disclosed herein, a policy service can be provided by a policy server executing a policy engine. The policy engine can be configured to collect rules from a manager. In some embodiments, the rules are compiled into a policy that can be associated, by the manager, with one or more managed devices. The manager can include, for example, a parent, employer, or other entity and the managed devices can be associated with children, employees, or other entities subject to control or monitoring by the manager. The rules can be based on a number of variables and values specified for the variables.

In some embodiments, third parties can submit rules and/or rules collected from third parties can be used to modify a policy created by a manager. If a manager enables the third party rule submission features disclosed herein, rules received from third parties can be used to modify the policies. In some instances, third party rule submissions are validated before being used to modify policies. Rules can be validated by a validation service, by managers, by the policy server, or otherwise to ensure that the rules are legitimate. When electronic activity associated with a managed device is detected, the policy server can identify a relevant policy and/or rule. If activity complies with the policy, the activity can be allowed. If the activity does not comply with the policy, the activity can be blocked and a notification for the manager can be created. The manager can create exceptions, update policies, and/or take other actions in response to the notifications.

According to one aspect of the concepts and technologies disclosed herein, a method is presented for receiving, at a policy server, a rule, generating a policy based, at least partially, upon the rule, receiving a further rule from a third party device, and determining if third party rule submissions are enabled. In response to determining that the third party rule submissions are enabled, the method further can include validating the further rule, and updating the policy based, at least partially, upon the further rule. In some embodiments, the rule includes a variable and a value specified for the variable. The rule can be received from a manager device. In some embodiments, the policy defines electronic activity allowed at a managed device. In some embodiments, the method further includes detecting electronic activity associated with the managed device, identifying a rule that is relevant to the electronic activity, determining if the rule allows the electronic activity, and in response to determining that the rule allows the electronic activity, allowing the electronic activity.

In some embodiments, the method also can include in response to determining that the rule does not allow the electronic activity, generating a notification for the manager device, and sending the notification to the manager device. In some embodiments, the method also includes in response to determining that the rule does not allow the electronic activity, generating a notification for the manager device, sending the notification to the manager device, determining if an exception is received from the manager device, in response to determining that the exception is not received, blocking the activity, and in response to determining that the exception is received, allowing the activity. In some embodiments, in response to determining that the exception is received, the method further includes determining if the policy is to be updated, and updating the policy in response to determining that the policy is to be updated.

According to another aspect of the concepts and technologies disclosed herein, a computer storage medium is disclosed. The computer storage medium includes computer executable instructions that, when executed by a policy server, cause the policy server at least to receive a rule including a variable and a value specified for the variable, generate a policy based, at least partially, upon the rule, store the policy at a policy repository in communication with the policy server, receive a further rule from a third party device, determine if third party rule submissions are enabled for the policy, in response to determining that the third party rule submissions are enabled, validate the further rule to determine if the further rule is legitimate, update the policy based, at least partially, upon the further rule in response to determining that the further rule is legitimate.

In some embodiments, validating the further rule includes presenting the further rule to an authorized entity and receiving data indicating that the authorized entity approves the further rule. In some embodiments, validating the further rule includes determining that the further rule is provided by an entity entitled to submit the further rule without validation of the further rule. The rule can be received from a manager device in communication with the policy server, and can define electronic activity allowed at a managed device. In some embodiments, the computer storage medium further includes computer-executable instructions that, when executed by the policy server, cause the policy server to detect electronic activity occurring at the managed device, identify a rule that is relevant to the electronic activity, determine if the rule allows the electronic activity, and in response to determining that the rule allows the electronic activity, allow the electronic activity.

In some embodiments, the computer storage medium further includes computer-executable instructions that, when executed by the policy server, cause the policy server to in response to determining that the rule does not allow the electronic activity, generate a notification for the manager device to inform the manager device of the electronic activity, send the notification to the manager device, determine if an exception is received from the manager device, in response to determining that the exception is not received, block the activity, and in response to determining that the exception is received, allow the activity, determine if the policy is to be updated, and update the policy in response to determining that the policy is to be updated.

According to yet another aspect of the concepts and technologies disclosed herein, a method includes detecting, at a policy server, electronic activity associated with a managed device, identifying a policy associated with the managed device, the policy including at least two rules, each of the plurality of rules having a variable and a value specified for the variable, identifying a rule of the plurality of rules that is relevant to the electronic activity, determining if the rule permits the electronic activity based, at least partially, upon the variable and the value specified for the variable, and in response to determining that the rule allows the electronic activity, allowing the electronic activity.

According to some embodiments, the method further includes in response to determining that the rule does not allow the electronic activity, generating a notification for a manager device and sending the notification to the manager device. The method also can include in response to determining that the rule does not allow the electronic activity, generating a notification for a manager device, sending the notification to the manager device, determining if an exception is received from the manager device, in response to determining that the exception is not received, blocking the activity, and in response to determining that the exception is received, allowing the activity, determining if the policy is to be updated, and updating the policy in response to determining that the policy is to be updated.

In some embodiments, the method further includes generating, at the policy server, the policy. In some implementations, generating the policy includes receiving the plurality of rules at the policy server, generating the policy based, at least partially, upon the plurality of rules, receiving a further rule from a third party device, determining if third party rule submissions are enabled, and in response to determining that the third party rule submissions are enabled, validating the further rule, and updating the policy based, at least partially, upon the further rule. According to some embodiments, validating the further rule includes presenting the further rule to the manager device and receiving data indicating that the manager device approves the further rule.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to methods, systems, and computer-readable media for monitoring and controlling electronic activity using validation and third party rule submission. According to the concepts and technologies disclosed herein, a policy service is provided. The policy service can be provided by a policy engine executing on a policy server, though this is not necessarily the case. The policy engine can be configured to collect rules from a manager or other entity. The rules can be used to generate a policy associated with one or more managed devices. According to various embodiments, the manager includes, for example, a parent, employer, teacher, or other entity. Similarly, the managed devices can be associated with one or more children, employees, student, or other entities subject to control or monitoring by the manager.

The polices can include one or more rules. The rules can be based on any number of variables and values specified for the variables. In some embodiments, third parties can submit rules. The rules received from third parties can be used to modify a policy created by a manager, if a manager enables the third party rule submission features disclosed herein. In some instances, third party rule submissions are validated before being used to modify policies, while in other instances some entities such as law enforcement can bypass validation. Rules can be validated by a validation service, by managers, by the policy server, or other entities to determine if the rules are legitimate.

The policies and/or rules can be used to control or monitor electronic activity associated with the managed devices. When electronic activity associated with a managed device is detected, the policy server can identify a relevant policy and/or rule. If the electronic activity complies with the policy or rule, the activity can be allowed. If the activity does not comply with the policy, the activity can be blocked and a notification for the manager can be created. In response to the notification, the manager can create exceptions, update policies, and/or take other actions in response to the notifications.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
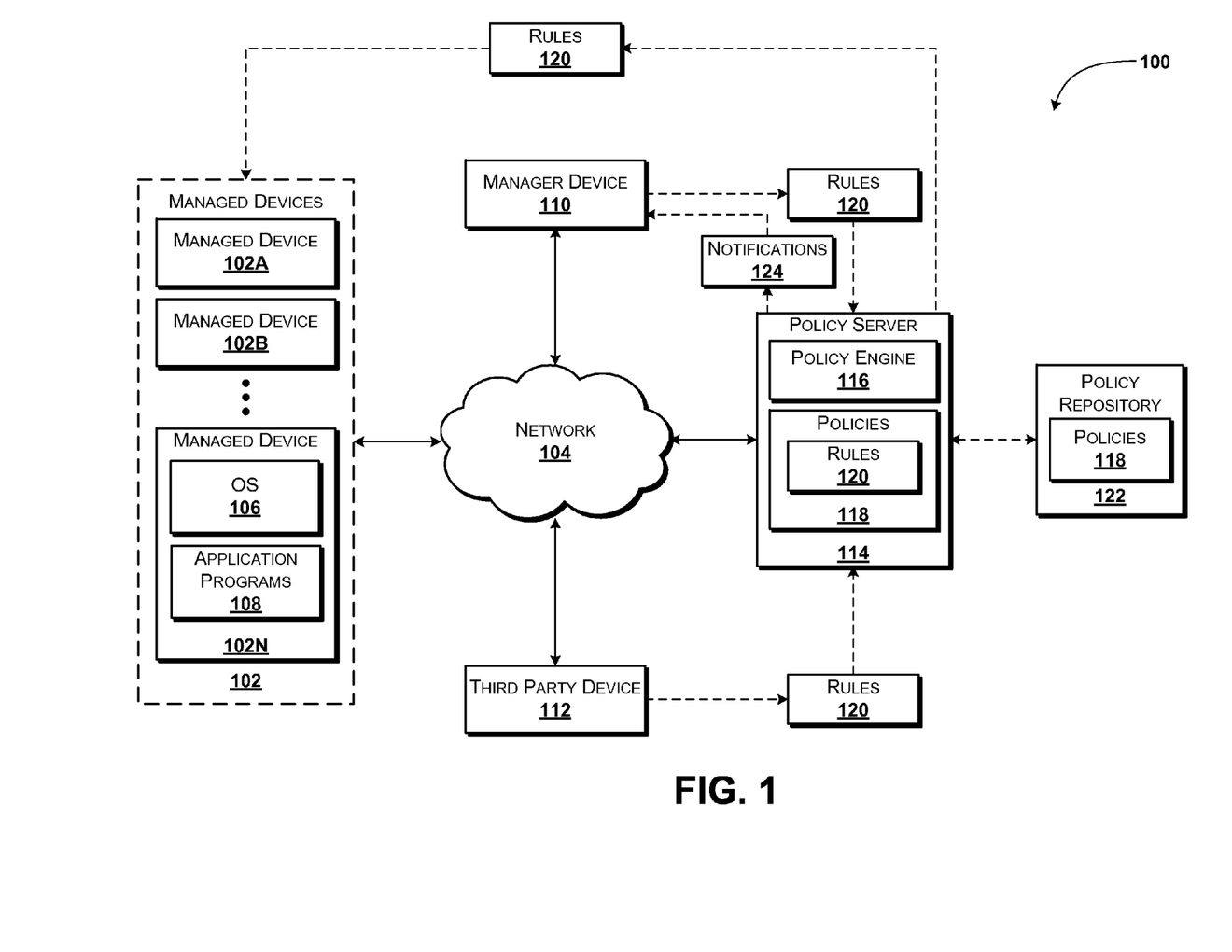
FIG. 1 is a system diagram illustrating an illustrative operating environment for the various embodiments disclosed herein.

Referring now to FIG. 1, aspects of an operating environment 100 in which various embodiments of the concepts and technologies disclosed herein for monitoring and controlling electronic activity will be described, according to an illustrative embodiment. The operating environment 100 shown in FIG. 1 includes a number of managed devices 102A-N (hereinafter collectively referred to as "managed devices 102" and/or generically referred to as a "managed device 102"). According to various embodiments, the managed devices 102 are configured to communicate with one or more devices operating in communication with or as part of a communications network ("network") 104. According to various embodiments, the functionality of the managed devices 102 described herein may be provided by one or more server computers, desktop computers, mobile telephones, laptop computers, set-top boxes, other computing systems, and the like. Some, all, or none of the managed devices 102 can execute an operating system 106 and one or more application programs 108, as illustrated in FIG. 1 with respect to the managed device 102N.

The operating system 106 is a computer program for controlling the operation of the managed device 102N. The application programs 108 are executable programs configured to execute on top of the operating system 106 to provide various functionality. According to some embodiments, for example, the application programs 108 include messaging applications, web browsers, shopping applications, stand-alone applications, web-enabled applications, multimedia applications, other applications, combinations thereof, and the like. In the described embodiments, the application programs 108 are described as including a web browser for interacting with various online resources such as web pages, email programs, instant message and/or chat applications, social networking applications, combinations thereof, and the like. Because these and other application programs are generally understood, these application programs 108 are not described herein in additional detail.

According to various embodiments, the operating environment 100 also includes a manager device 110. The functionality of the manager device 110 can be provided by one or more desktop computers, mobile telephones, laptop computers, set-top boxes, and/or other computing systems. In some embodiments, the functionality of the manager device 110 is provided by a server computer that executes or hosts a manager device service or application. For purposes of describing the various embodiments disclosed herein, the manager device 110 is described as a personal computer that is configured to communicate via the network 104. It should be understood that this embodiment is illustrative, and should not be construed as being limiting in any way.

The manager device 110 can be associated with a party entitled to monitor and/or control electronic activity associated with the managed devices 102. The electronic activity can include actual activity conducted at the managed device 102 as well as attempted electronic activity such as electronic activity requested or attempted. In some embodiments, for example, the managed devices 102 are associated with a child or children of a parent, and the manager device 110 is associated with the parent. In other embodiments, the managed devices 102 are associated with one or more employees, and the manager device 110 is associated with an employer. In yet other embodiments, the managed devices 102 are loaned or leased to a party by a user of the manager device 110. It should be understood that these embodiments are illustrative, and should not be construed as being limiting in any way.

The operating environment 100 also can include a third party device 112. For purposes of the description and the claims, a "third party" includes any entity or device other than the manager device 110 and/or the managed devices 102. The functionality of the third party device 112 can be provided by one or more desktop computers, mobile telephones, laptop computers, set-top boxes, and/or other computing systems, and/or by a server computer hosting or executing a third party device service or application. For purposes of describing the various embodiments disclosed herein, the third party device 112 is described as a personal computer that is configured to communicate via the network 104. It should be understood that this embodiment is illustrative, and should not be construed as being limiting in any way.

The operating environment 100 also can include a policy server 114 that operates as a part of or in communication with the network 104. The functionality of the policy server 114 can be provided by one or more server computers, virtual server computers, and/or other real or virtual computing resources. According to various implementations, the policy server 114 stores, executes, and/or hosts a policy engine 116 for generating, storing, and applying electronic activity policies ("policies") 114 to electronic activity associated with the managed devices 102. As explained in more detail herein, the policies 118 can include any number of rules 120. As shown in FIG. 1, the rules 120 can be received at the policy server 114 from the manager device 110, the third party device 112, and/or other entities such as law enforcement personnel, network security personnel, rule sharing services, and/or other entities (not illustrated).

The policy engine 116 is configured to receive the rules 120, to determine a user and/or group of users with which the rules 120 are associated, and to generate one or more policies 118 based upon the rules 120. According to various embodiments, the policy engine 116 is configured to store the policies 118 at a data storage device such as, for example, a policy repository 122. The functionality of the policy repository 122 described herein may be provided by one or more memory devices, mass storage devices, or other data storage devices included at or associated with the policy server 114; by a server computer, database, datastore, or other device in communication with the policy server 114; by one or more computer readable media (as defined herein); by other storage systems, and/or the like.

The policy server 114 can execute queries against, or submit queries the policy repository 122. The policy server 114 can execute the queries, for example, when the policy engine 116 receives a request to provide policies 118 and/or rules 120. As will be explained in more detail herein, the policies 118 and/or rules 120 can be requested by the network 104 to control and/or monitor electronic activity associated with the managed devices 102. The policies 118 and/or the rules 120 also can be obtained by the policy server 114 for presentation and/or providing to the manager device 110. In yet other embodiments, the policy server 114 obtains the policies 118 and/or the rules 120 in response to a request generated by the managed devices 102, and/or at other times.

In some embodiments, some, all, none, or each of the managed devices 102 can execute a security application (not shown). The security application can be configured to call the policy engine 116 when the managed device 102 is powered on, registers with a network, attempts to establish a data session, or otherwise begins or engages in electronic activity. The policy server 114 can respond with the polices 118 and/or rules 120. These policies 118 and/or rules 120 can be applied by the managed device 102 and/or other devices, if desired. While the electronic activity described herein is illustrated and referred to as including inter-party communications, it should be understood that this is not necessarily the case. In particular, the concepts and technologies disclosed herein can be applied to electronic activity of any kind, if desired.

According to various embodiments, a user of the policy service described herein communicates with the policy server 114 to create a policy 118. The user can communicate with the policy server 114 using the manager device 110 or other device. The user creates a policy 118 by submitting any number of rules 120. The rules 120 can include various variables, which are described in more detail below with reference to FIG. 2. The variables can define various aspects of electronic activity and specify values for those variables. As such, the variables and their respective values can define the types of electronic activity that are allowed or restricted according to the policy 118. The user can associate the policy 118 with one or more of the managed devices 102.

According to various embodiments, when electronic activity is attempted or engaged in at one or more managed devices 102, the managed device 102 or other device, entity, or application can call the policy engine 114 to determine if the electronic activity is allowed. The managed device 102 is identified, a relevant policy 118 is identified, and a rule 120 corresponding to the electronic activity is identified. If the policy 118 and/or rule 120 allows the electronic activity, the electronic activity can be allowed. If not, the policy server 114 can generate a notification 124 that can be passed to the manager device 110 and/or other entity to inform a user about the attempted access.

The manager device 110 can respond to the notification 124 by, for example, creating an exception to the rule 120 to allow the electronic activity. The manager device 110 also can respond with instructions to update the policy 118 and/or rules 120 to prevent further notifications 124. Upon receiving the response from the manager device 110, the policy server 114 can allow the electronic activity, block the electronic activity, update the policy 118 and/or rules 120, and/or take other actions. It should be understood that these embodiments are illustrative, and should not be construed as being limiting in any way.

The concepts and technologies disclosed herein also support supplementing and/or creating policies 118 and/or rules 120 based upon rules 120 submitted by third parties, for example, using the third party devices 112. Third parties can submit rules 120 to the policy server 114. If users associated with the manager device 110 allow third party rule submissions, the rules 120 from the third parties can be used to supplement the policies 118. In some embodiments, the policy server 114 enforces a validation step on rules 120 received from third parties. For example, the policy server 114 may wait until a user associated with the manager device 110 reviews and approves the rule 120 received from the third party; until a same or similar rule 120 is received from other third parties (not shown); or until other validation steps are performed before modifying the policy 118 and/or rules 120. In some embodiments, rules 120 submitted by network personnel, law enforcement personnel, and/or other authorized entities can be used to modify policies 118 and/or rules 120 without being validated. These and other embodiments are described in more detail below.

FIG. 1 illustrates three managed devices 102, one network 104, one manager device 110, one third party device 112, one policy server 114, and one policy repository 122. It should be understood, however, that various implementations of the operating environment 100 include less than three or more than three managed devices 102, multiple networks 104, multiple manager devices 110, multiple third party devices 112, multiple policy servers 114, and multiple policy repositories 122. As such, the illustrated embodiment should be understood as being illustrative, and should not be construed as being limiting in any way.

Figure 2:
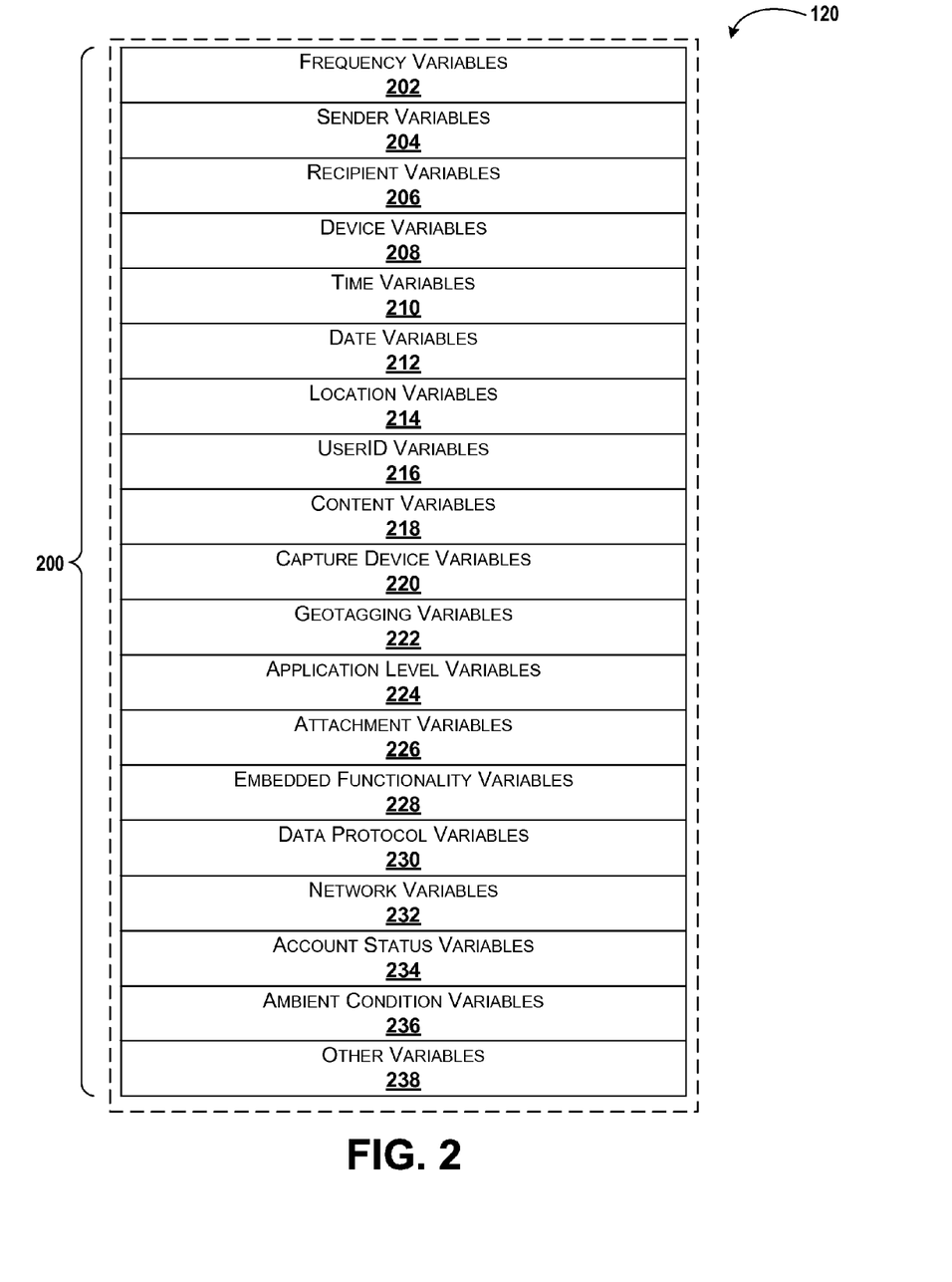
FIG. 2 is a line diagram schematically illustrating aspects of the rules, according to an illustrative embodiment.

Turning now to FIG. 2, additional aspects of the rules 120 are described. In particular, FIG. 2 is a data structure diagram illustrating variables 200 that can be used to define one or more rules 120 of a particular policy 118, according to an illustrative embodiment of the present disclosure. It should be understood that one or more of the rules 120 can include none, one, or more than one of the illustrated variables 200. It should be understood that the illustrated variables 200 are illustrative, and should not be construed as being limiting in any way. It also should be understood that the rules 120 and/or the policies 118 can be generated, modified, and/or stored at any time. As such, one or more of the illustrated variables 200 and/or additional or alternative information can be used to define or modify rules 120 at any time.

According to various embodiments, the variables 200 include, for example, frequency variables 202, sender variables 204, recipient variables 206, device variables 208, time variables 210, date variables 212, location variables 214, userID variables 216, content variables 218, capture device variables 220, geotagging variables 222, application level variables 224, attachment variables 226, embedded functionality variables 228, data protocol variables 230, network variables 232, account status variables 234, ambient conditions variables 236, other variables 238, and/or other information (not shown). Each of these illustrative variables 200 are described in additional detail below. Users can create the rules 120, for example, via a web interface that provides fields for selecting from these and other variables 200 and controls for specifying values for the variables 200. It should be understood that these embodiments are illustrative, and should not be construed as being limiting in any way.

The frequency variables 202 can provide variables relating to a frequency of electronic activity. A "frequency" of electronic activity can include, for example, a number of messages or requests during a specified time period, an average or mean time period between messages or requests, a total number of messages or requests, combinations thereof, or the like. In one example embodiment, a user can use the frequency variables 202 to specify a rule 120 for controlling or monitoring electronic activity based upon, for example, a number of instant messages or text messages sent, received, or viewed within a sixty second interval. Because any time period and/or type of electronic activity can be specified using other variables 200 described herein, it should be understood that this embodiment is illustrative, and should not be construed as being limiting in any way.

The sender variables 204 and the recipient variables 206 can provide variables relating to a sender and/or recipient, respectively, of electronic activity. The sender can include, for example, a sender of an electronic message, a sender of a text message, a sender of a file transferred over a data connection, combinations thereof, and the like. The recipient can include, for example, a recipient of an electronic message, a recipient of a text message, a recipient of a file transferred over a data connection, combinations thereof, and the like. Thus, a user can use the sender variables 204 and the recipient variables 206 for controlling or monitoring electronic activity based upon the sender and/or recipient of the electronic activity. It should be understood that this embodiment is illustrative, and should not be construed as being limiting in any way.

The device variables 208 can provide variables relating to a device used to conduct the electronic activity monitored and/or controlled by the policy server 114. The device variables 208 can specify, for example, one of the managed devices 102 that is subject to a rule 120 including the device variables 208. A user can use the device variables 208 to limit or expand applicability of a rule 120 based, at least partially, upon a managed device 102 used to conduct the electronic activity subject to the rule 120. It should be understood that this embodiment is illustrative, and should not be construed as being limiting in any way.

The time variables 210 and the date variables 212 can provide variables relating to times and dates, respectively, of electronic activity. A user can use the time variables 210 to create rules 120 that are used to monitor, report, and/or control electronic activity occurring during or outside of times specified by the time variables. Thus, for example, a user can define a rule 120 that allows or disallows electronic activity on specified days, at specified times, during specified time periods, and the like. Similarly, the user can use the date variables 212 to allow or disallow electronic activity on specific dates. It should be understood that these embodiments are illustrative, and should not be construed as being limiting in any way.

The location variables 214 can provide variables relating to a location associated with electronic activity. The "location" specified by the location variables 214 can include geographic locations and/or network locations. The user can use the location variables 214 to define locations at which electronic activity is allowed and/or disallowed. For example, a parent or other user can specify that electronic activity is not allowed to occur at a child's school, a manager can specify that electronic activity is or is not allowed at a workplace, and/or the like. It should be understood that these embodiments are illustrative, and should not be construed as being limiting in any way.

The userID variables 216 can provide variables relating to a userID associated with electronic activity. The "userID" can include a userID or other information describing a user of a device. The userID variables 216 thus can be used to tailor any of the rules 120 to relate to a particular user instead of, or in addition to, a particular managed device 102. As such, the concepts and technologies disclosed can be used to allow or restrict certain activity for some users, while allowing or restricting the same or identical activity for other users of the same managed device 102. It should be understood that this embodiment is illustrative, and should not be construed as being limiting in any way.

The content variables 218 can provide variables relating to a type of content involved in the electronic activity. The content variables 218 can be used, for example, to define a content type or types subject to a particular rule 120. Thus, a user can use the content variables 218 to specify that text message content, video content, photographic content, image content, application content, voice content, and/or other types of content are or are not subject to a particular rule 120. Thus, for example, a user can specify a rule 120 that applies only to photographic content. It should be understood that this embodiment is illustrative, and should not be construed as being limiting in any way.

The capture device variables 220 can provide variables relating to a capture device used to capture content involved in electronic activity. The capture device variables 220 can be used, for example, to electronic activity that is or is not allowed based, at least partially, upon a capture device used to capture content involved in the electronic activity. A capture device can include, for example, a device camera, device microphone, device sensors, and the like. It should be understood that this embodiment is illustrative, and should not be construed as being limiting in any way.

The geotagging variables 222 can provide variables relating to geotagging of data involved in the electronic activity. The geotagging variables 222 can be used, for example, to allow or disallow electronic activity based, at least partially, upon a determination as to whether shared content has geotagging information. Thus, a user can use the geotagging variables 222, for example, to prevent users from sharing geotagging information. It should be understood that this embodiment is illustrative, and should not be construed as being limiting in any way.

The application level variables 224 can provide variables relating to an application level associated with the electronic activity. An "application level" can be used to define an application involved in electronic activity as well as a level at which the electronic activity is occurring with the application. The "level" can include, for example, a login level indicating that a login is required to use the application, an open level indicating that no login is required, other levels, and the like. Thus, users can use the application level variables 224 to define additional details of the electronic activity that are to be subjected to control by the rule 120. It should be understood that this embodiment is illustrative, and should not be construed as being limiting in any way.

The attachment variables 226 can provide variables relating to attachments received or sent via the electronic activity. As such, the attachment variables 226 can be used to define whether electronic activity including the sending of and/or receipt of attachments is allowed, though this is not necessarily the case. Users can use the attachment variables 226 to specify whether rules 120 apply, or do not apply, to electronic activity including transfer, opening, saving, or execution of attachments. It should be understood that this embodiment is illustrative, and should not be construed as being limiting in any way.

The embedded functionality variables 228 can provide variables relating to embedded functionality received or sent via the electronic activity and/or interacted with by the electronic activity. As such, the embedded functionality variables 228 can be used to define whether electronic activity relating to embedded functionality such as embedded applications, executables, scripts, cookies, links, and the like are allowed or not allowed. It should be understood that this embodiment is illustrative, and should not be construed as being limiting in any way.

The data protocol variables 230 can provide variables relating to data protocols used or otherwise associated with the electronic activity. As such, the data protocol variables 230 can be used to define data protocols that are or are not allowed as part of the electronic activity. Thus, users can tailor rules 120 based, at least partially, upon data protocols used or not used as part of the electronic activity. Data protocols can include, for example, specific protocols and/or standards such as the short message service ("SMS") protocol. The data protocols also can include general indications of communications such as text messaging, multimedia messaging, peer-to-peer transfers, and the like. It should be understood that these embodiments are illustrative, and should not be construed as being limiting in any way.

The network variables 232 can provide variables relating to networks involved with electronic activity and/or over which the electronic activity occurs. The "networks" can include, for example, real or virtual networks including, but not limited to, the network 104 and/or the various networks described herein with reference to FIG. 5. Users can use the network variables 232 to tailor rules 120 based, at least partially, upon networks used, accessed, and/or otherwise involved in the electronic activity. It should be understood that this embodiment is illustrative, and should not be construed as being limiting in any way.

The account status variables 234 can provide variables relating to an account status associated with a device involved in the electronic activity. An account status can include, for example, a status of usage such as "under limits," "at limits," "beyond limits," "balance owed," "device stolen," and the like. Users can use the account status variables 234 to tailor rules 120 based, at least partially, upon an account status. In some embodiments, users use the account status variables 234 to prevent usage of features not included in an account, from exceeding usage limits, and the like. It should be understood that these embodiments are illustrative, and should not be construed as being limiting in any way.

The ambient conditions variables 236 can provide variables relating to ambient conditions at a device involved in the electronic activity. Ambient conditions can include, for example, sound levels, light levels, temperature levels, and/or other conditions; numbers of users and/or devices near the device; and/or other information relating to ambient conditions at or near the device. Users can use the ambient conditions variables 236 to tailor rules 120 based, at least partially, upon conditions at or near the device. It should be understood that this embodiment is illustrative, and should not be construed as being limiting in any way.

The other variables 238, can provide variables relating various types of information. The other variables 238 include, for example, sensor information that can be accessed and used to limit or allow electronic activity, pairing information indicating if other devices are paired to the device, combinations thereof, and the like. These and other types of information can be used to tailor the rules 120. It should be understood that these embodiments are illustrative, and should not be construed as being limiting in any way.

Figure 3:
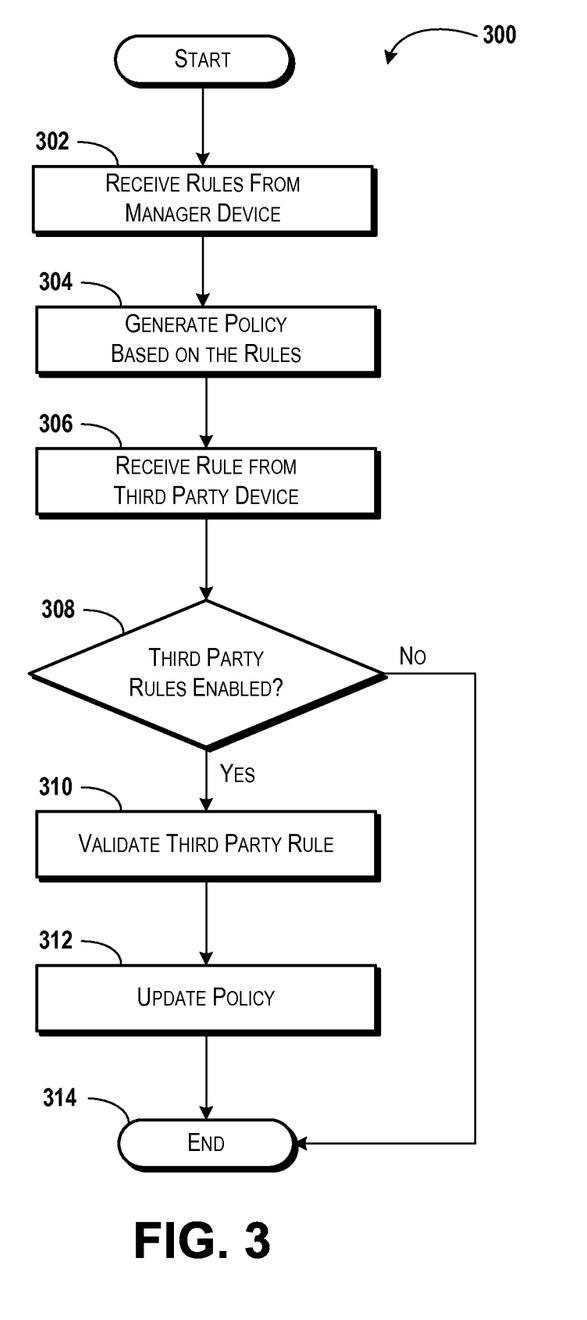
FIG. 3 is a flow diagram showing aspects of a method for creating policies, according to an illustrative embodiment.

Turning now to FIG. 3, aspects of a method 300 for creating policies 118 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

For purposes of illustrating and describing the concepts of the present disclosure, the method 300 is described as being performed by the policy server 114 via execution of one or more software modules such as, for example, the policy engine 116. It should be understood that additional and/or alternative devices and/or network nodes can provide the functionality described herein via execution of one or more modules, applications, and/or other software including, but not limited to, the policy engine 116. Thus, the illustrated embodiments are illustrative, and should not be viewed as being limiting in any way.

The method 300 begins at operation 302, wherein the policy server 114 receives rules 120 from the manager device 110. The rules 120 can be received in various formats and/or via various methodologies. In some embodiments, the rules 120 are submitted to the policy server 114 as a data file from the manager device 110. For example, the manager device 110 can host or execute an application program for generating and/or sharing the rules 120.

In some embodiments, the rules 120 are created via a web portal or other functionality interacted with a manager, parent, employer, and/or other user. It can be appreciated from the description of FIG. 2 above that the rules 120 can include one or more of the variables 200. In some embodiments, the policy server 114 exposes a user interface ("UI") via which the user crafts the rules 120, for example, by specifying what variables 200 apply to a particular rule 120 and/or specifying values for those variables. Because the rules 120 can be generated using these and/or other approaches, it should be understood that this embodiment is illustrative, and should not be construed as being limiting in any way.

From operation 302, the method 300 proceeds to operation 304, wherein the policy server 114 generates a policy 118 based upon the rules 120 received in operation 302. In some embodiments, a policy 118 includes some or all rules 120 associated with a particular manager device 110, one or more managed devices 102, an account associated with a particular user, combinations thereof, and the like. In some embodiments, the policy 118 includes a collection of the rules 120. In other embodiments, the policy 118 further includes and/or indicates relationships between the rules 120. In some embodiments, the policy 118 is received at operation 302 instead of, or in addition to, the rules 120. As such, operation 304 can be skipped in some embodiments. As such, it should be understood that the illustrated embodiment is illustrative, and should not be construed as being limiting in any way. Although not shown in FIG. 3, the policy can be stored by the policy server 114.

From operation 304, the method 300 proceeds to operation 306, wherein the policy server 114 receives one or more rules 120 from a third party device 112. The third party device 112 can be associated a user of the policy service provided by the policy server 114, by a system administrator, a law enforcement entity, combinations thereof, and the like. As explained herein, the concepts and technologies disclosed herein allow third parties to share rules 120 and/or policies 118 with other users, thereby creating a community of entities who generate and/or manage rules 120 and/or policies 118. As such, parents, managers, and/or other entities can rely, at least partially, upon other entities in developing and deploying the rules 120.

In some embodiments, third parties such as users of the third party device 112 can submit the rules 120 but these rules 120 may or may not be considered "received" by the policy server 114 until an identical rule 120 is received from another third party device (not shown in the FIGURES), verified by a verification service or other entity such as law enforcement, and/or otherwise determined to be legitimate. Thus, the operation 306 can include determining that a rule 120 shared by a third party is legitimate and is to be shared with other users. It should be understood that this embodiment is illustrative, and should not be construed as being limiting in any way.

From operation 306, the method 300 proceeds to operation 308, wherein the policy server 114 determines if third party rule submissions are enabled by a user or account associated with the manager device 110. In some embodiments, users or other entities associated with the manger device 110 can allow or disallow third party rule submissions. This can be indicated by way of preferences or settings associated with the user and examined in operation 308.

If the policy server 114 determines in operation 308 that third party rule submissions are enabled by the user or other entity associated with the manager device 110, the method 300 proceeds to operation 310. At operation 310, the policy server 114 can validate the third party rule submission received in operation 306. In some embodiments, as mentioned above with regard to FIG. 1, validation can be required of rules 120 received from third parties, while in other embodiments validation is not required. For example, law enforcement, network personnel, and/or other authorized entities can be allowed to create and submit rules 120 without validation.

In other embodiments, third parties such as other users of the policy server 114 can indicate that a rule 120 is to be shared with other users. These rules 120 may be subject to validation prior to being used to update or supplement other users' polices 118, if desired. Validation can include presenting the rule 120 to a user associated with the manager device 110, waiting until the same or similar rule is received by at least one other third party entity, providing the rule 120 to a validation service, and/or executing other steps for ensuring that the rule 120 received from the third party device 112 is legitimate. Because other methods of validating the rules 120 are contemplated, it should be understood that these embodiments are illustrative, and should not be construed as being limiting in any way.

From operation 310, the method 300 proceeds to operation 312, wherein the policy server 114 can update the policy 118 generated in operation 304 with the rule 120 received in operation 306. Although not illustrated in FIG. 3, the policy server 114 can store the policy 118 in the policy repository 124 or other data storage device, if desired. In some embodiments, the policy server 114 stores the policy 118 with data identifying the managed devices 102 and/or the manager device 110, and associates the data with the stored policy 118. It should be understood that this embodiment is illustrative, and should not be construed as being limiting in any way.

From operation 312, the method 300 proceeds to operation 314. The method 300 also can proceed to operation 314 from operation 308 if the policy server 114 determines that the third party rule submissions are not enabled. The method 300 ends at operation 314.

Figure 4:
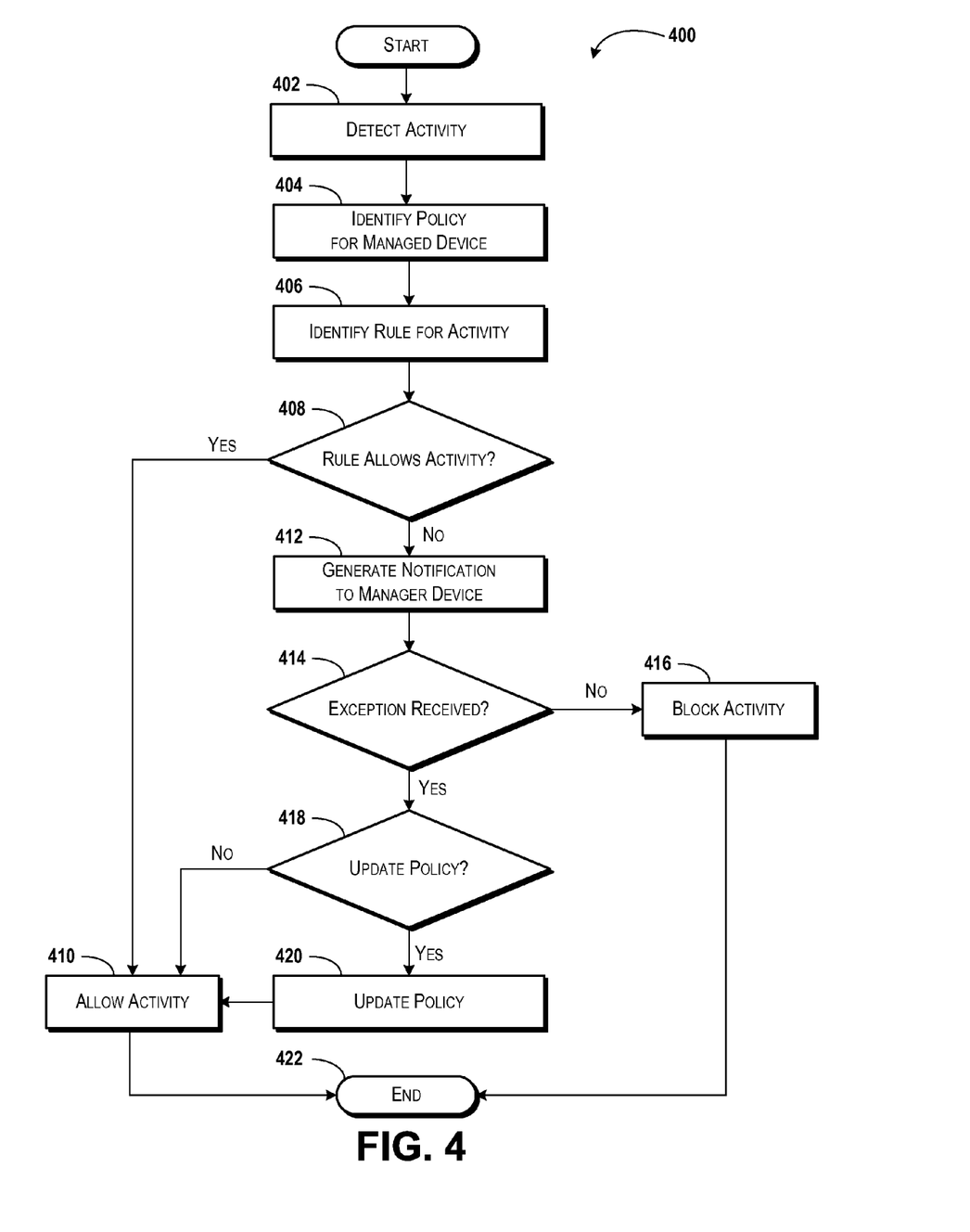
FIG. 4 is a flow diagram showing aspects of a method for controlling electronic activity, according to another illustrative embodiment.

Turning now to FIG. 4, aspects of a method 400 for controlling electronic activity using the policies 118 will be described in detail, according to an illustrative embodiment. For purposes of illustrating and describing the concepts and technologies disclosed herein, the method 400 is described as being performed by the policy server 114 via execution of one or more software modules such as, for example, the policy engine 116 or other functionality. It should be understood that additional and/or alternative devices, services, and/or network nodes can provide the functionality described herein via execution of one or more application programs, modules, and/or other functionality including, but not limited to, the policy engine 116. As such, the illustrated embodiment is illustrative, and should not be viewed as being limiting in any way.

The method 400 begins at operation 402, wherein the policy server 114 detects electronic activity associated with one or more of the managed devices 102. The policy server 114 can detect the electronic activity in various ways. In some embodiments, for example, the managed devices 102 are configured to register with a network 104 to complete any sort of electronic communications. For example, one of the managed devices 102 can include a cellular phone that registers with a cellular network when the cellular phone is turned on or moves into an area serviced by the cellular network. Similarly, a STB can register with a television network to obtain access to television programming, for example. It should be understood that these embodiments are illustrative, and should not be construed as being limiting in any way.

In other embodiments, the policy server 114 is configured to monitor communications associated with the managed devices 102. The communications can be routed through or exposed to the policy server 114. In yet other embodiments, the network 104 calls the policy server 114 when electronic activity is requested and/or commences. Because the policy sever 114 can detect the electronic activity via these and/or other ways, it should be understood that these embodiments are illustrative, and should not be construed as being limiting in any way.

From operation 402, the method 400 proceeds to operation 404, wherein the policy server 114 identifies a policy 118 associated with the request received in operation 402. It can be appreciated from the above description of how the electronic activity is detected in operation 402 that the policy server 114 can identify a user or other entity associated with the detected activity via various mechanisms and/or methodologies. For example, the policy server 114 can present a login screen for a user of one of the managed devices 102, for example, and data submitted thereby can identify the user, device, or other entity associated with one or more of the policies 118. The policy server 114 also can have access to device data exposed by one or more of the managed devices 102, to location information that indicates users of the managed devices 102, and/or other information that can be used to identify the policy 118. Any suitable method of identifying a policy 118 or identifying a user or entity associated with a policy 118, can be used in operation 404. As such, it should be understood that the above-provided examples are illustrative, and should not be construed as being limiting in any way.

From operation 404, the method 400 proceeds to operation 406, wherein the policy server 114 identifies one or more rules 120 that apply to the electronic activity detected in operation 402. The policy server 114 can search the policy 118 identified in operation 404 for rules 120 with one or more variables 200 that apply to the electronic activity detected in 402. Because the rules 120 can be identified in other ways, it should be understood that this embodiment is illustrative, and should not be construed as being limiting in any way.

From operation 406, the method 400 proceeds to operation 408, wherein the policy server 114 determines if the rule 120 identified in operation 406 allows the electronic activity detected in operation 402. In operation 408, the policy server 114 can evaluate the variables 200 specified by the rule 120 and determine if the electronic activity satisfies, or does not satisfy the rule 120. If the policy server 114 determines, in operation 408, that the rule 120 identified in operation 406 allows the electronic activity detected in operation 402, the method 400 proceeds to operation 410.

In operation 410, the policy server 114 allows the electronic activity. It should be understood that in some embodiments the policy server 114 does not control the electronic activity. As such, operation 410 can include, for example, the policy server 114 issuing a command to another node or device to allow the electronic activity. Because the policy server 114 can be called by a network device, it should be understood that operation 410 can include a response to the call with an indication that the electronic activity is to be allowed. It should be understood that this embodiment is illustrative, and should not be construed as being limiting in any way.

If the policy server 114 determines, in operation 408, that the rule 120 identified in operation 406 does not allow the electronic activity detected in operation 402, the method 400 proceeds to operation 412. At operation 412, the policy server 114 can notify a user or other entity associated with the manager device 110 that the electronic activity detected in operation 402 has been attempted by the managed device 102. In some embodiments, the policy server 114 generates the notification 124 and provides the notification 124 to the manager device 110. The notification 124 can include an instant message, an email, a report, and/or other form of notification. Because other ways of notifying the user or other entity associated with the manager device 110 are contemplated, it should be understood that these embodiments are illustrative, and should not be construed as being limiting in any way.

In some embodiments, the notification 124 sent to the user or other entity associated with the manager device 110 includes action options. For example, the notification 124 can include an option to create a one-time exception, a permanent exception, to update a policy 118, and/or other actions. Thus, although not illustrated in FIG. 4, it should be understood that the method 400 can include receiving a response from the manager device 110 and/or other devices.

From operation 412, the method 400 proceeds to operation 414, wherein the policy server 114 determines if an exception has been received from the manager device 110. It should be understood that, depending upon the type of notification 124 sent in operation 412, the response from the manager device 110 can be received after some time has elapsed since the sending of the notification 124. As such, it should be understood that execution of the method 400 can be paused at operation 414 until a response is received from the manager device 110. In other embodiments, the method 400 can be completed assuming that an exception has not been received, and operation 414 can be executed again if an exception is later received by the policy server 114. It should be understood that these embodiments are illustrative, and should not be construed as being limiting in any way.

If the policy server 114 determines, in operation 414, that an exception has not been received from the manager device 110, the method 400 proceeds to operation 416. At operation 416, the policy server 114 blocks the electronic activity detected in operation 402. As explained above with regard to operation 410, the policy server 114 also can issue a command or response indicating that the electronic activity is to be blocked and/or that the electronic activity does not comply with the rules 120.

If the policy server 114 determines, in operation 414, that an exception has been received from the manager device 110, the method 400 proceeds to operation 418. In operation 418, the policy server 114 determines if a response from the manager device 110 indicated that the policy 118 is to be updated. The manager or other user associated with the manager device 110 can indicate, for example, that the electronic activity is to be allowed and/or to modify notification settings preferences.

If the policy server 114 determines, in operation 418, that the policy 118 is not to be updated, the method 400 proceeds to operation 410 described above. At operation 410, the policy server 114 can allow, or command or indicate allowance of, the electronic activity detected in operation 402. If the policy server 114 determines, in operation 418, that the policy 118 is to be updated, the method 400 proceeds to operation 420.

At operation 420, the policy server 114 updates the policy 118. The policy 118 can be updated to prevent future notifications 124 for activity similar to the electronic activity detected in operation 402, for example. Other modifications are contemplated and are possible. From operation 420, the method 400 proceeds to operation 410, wherein the policy server 114 can allow, or command or indicate allowance of, the electronic activity detected in operation 402.

From operation 410, the method 400 proceeds to operation 422. The method 400 also proceeds to operation 422 from operation 416. The method 400 ends at operation 422.

Figure 5:
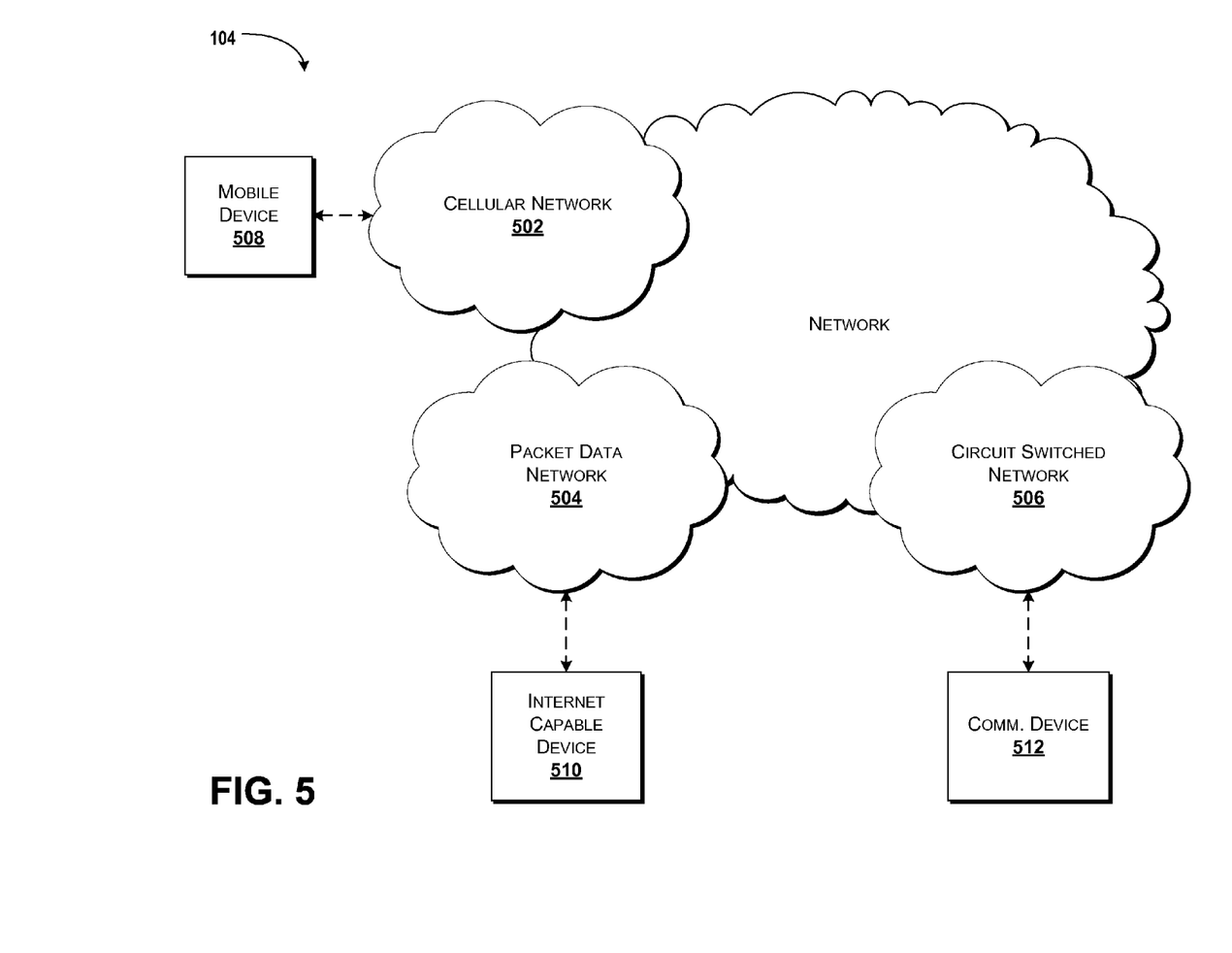
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

According to various implementations, a user can use any combination of the devices disclosed herein including, but not limited to, the mobile device 508, the Internet capable device 510, and/or the communication device 512 to access web pages or other resources, to access information stored by the policy server 114, to create, modify, and/or view policies 118 and/or rules 120, to receive, view, and/or act on notifications 124, to add, manage, and/or view lists of managed devices 102, and/or for other interactions with the policy server 114. As such, it should be understood that users can interface with the policy server 114 via any number and/or combination of devices.

Figure 6:
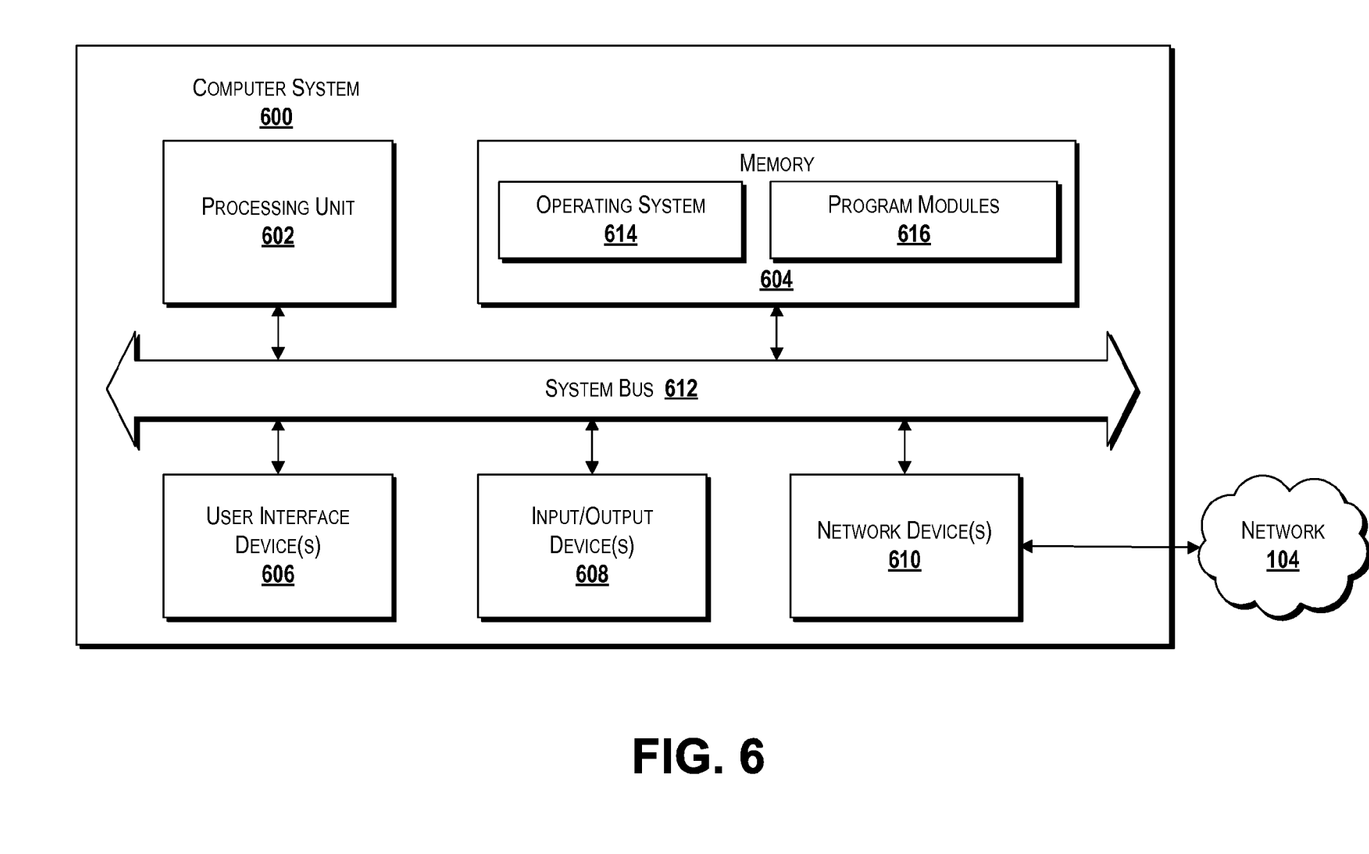
FIG. 6 is a block diagram illustrating an example computer system configured for monitoring and controlling electronic activity, according to some illustrative embodiments.

FIG. 6 is a block diagram illustrating a computer system 600 configured to provide the functionality described herein for monitor and/or control electronic activity using validation and third party rule submissions, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally know, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like. The program modules 616 may include various software and/or program modules described herein. In some embodiments, for example, the program modules 616 include the policy engine 116. This and/or other programs can be embodied in computer-readable media containing instructions that, when executed by the processing unit 602, perform one or more of the methods 300, 400 described in detail above with respect to FIGS. 3-4. According to embodiments, the program modules 616 may be embodied in hardware, software, firmware, or any combination thereof. Although not shown in FIG. 6, it should be understood that the memory 604 also can be configured to store the policies 118, the rules 120, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof, does not include waves, signals, and/or other transitory and/or intangible communication media, per se.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for monitoring and controlling electronic activity using validation and third party rules submission have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

I claim:

1. A method comprising:
receiving, at a policy server, a first rule comprising a variable and a value specified for the variable;
generating, at the policy server, a policy based upon the first rule, wherein the policy defines electronic activity allowed at a device;
storing, by the policy server, the policy at a policy repository in communication with the policy server;
receiving, by the policy server, a second rule from a third party device;
determining, by the policy server, if third party rule submissions are enabled;
in response to determining that the third party rule submissions are enabled,
validating, by the policy server, the second rule to determine if the second rule is legitimate,
updating, by the policy server, the policy based upon the second rule to obtain an updated policy, and
storing, by the policy server, the updated policy at the policy repository;
detecting, by the policy server, electronic activity associated with the device;
identifying, by the policy server, a policy rule that relates to the electronic activity detected; and
determining, by the policy server, if the policy rule allows the electronic activity detected.

2. The method of claim 1, wherein the first rule is received from a manager device.

3. The method of claim 2, further comprising:
in response to a determination that the policy rule does not allow the electronic activity,
generating a notification for the manager device, and
sending the notification to the manager device.

4. The method of claim 2, further comprising:
in response to a determination that the policy rule does not allow the electronic activity,
generating a notification for the manager device;
sending the notification to the manager device;
determining if an exception is received from the manager device;
in response to determining that the exception is not received, blocking the electronic activity; and
in response to determining that the exception is received, allowing the electronic activity.

5. The method of claim 4, further comprising:
in response to determining that the exception is received, determining if the updated policy is to be updated; and
updating the updated policy in response to determining that the updated policy is to be updated.

6. The method of claim 1, wherein the device comprises a managed device.

7. The method of claim 1, further comprising:
in response to a determination that the policy rule allows the electronic activity, allowing the electronic activity.

8. A computer storage medium having computer executable instructions stored thereon that, when executed by a processor, cause the processor to perform operations comprising:
receiving a first rule comprising a variable and a value specified for the variable;
generating a policy based upon the first rule, wherein the policy defines electronic activity allowed at a device;
storing the policy at a policy repository;
receiving a second rule from a third party device;
determining if third party rule submissions are enabled for the policy;
in response to determining that the third party rule submissions are enabled, validating the second rule to determine if the second rule is legitimate;
in response to determining that the second rule is legitimate, updating the policy based upon the second rule to obtain an updated policy;
storing the updated policy at the policy repository;
detecting electronic activity associated with the device;
identifying a policy rule that relates to the electronic activity detected; and
determining if the policy rule allows the electronic activity detected.

9. The computer storage medium of claim 8, wherein validating the second rule comprises presenting the second rule to an authorized entity and receiving data indicating that the authorized entity approves the second rule.

10. The computer storage medium of claim 8, wherein validating the second rule comprises determining that the second rule is provided by an entity entitled to submit the second rule without validation of the second rule.

11. The computer storage medium of claim 8, wherein the first rule is received from a manager device, and wherein the device comprises a managed device.

12. The computer storage medium of claim 11, wherein the computer-executable instructions, when executed by the processor, cause the processor to perform operations further comprising:
in response to determining that the policy rule allows the electronic activity, allowing the electronic activity.

13. The computer storage medium of claim 12, further comprising computer-executable instructions that, when executed by the processor, cause the processor to perform operations further comprising:
in response to determining that the policy rule does not allow the electronic activity,
generating a notification for the manager device to inform the manager device of the electronic activity,
sending the notification to the manager device,
determining if an exception is received from the manager device,
in response to determining that the exception is not received, blocking the electronic activity, and
in response to determining that the exception is received, allowing the electronic activity,
determining if the updated policy is to be updated, and
updating the updated policy in response to determining that the updated policy is to be updated.

14. A method comprising:
receiving, at a policy server, a plurality of rules, each of the plurality of rules having a variable and a value specified for the variable;
generating, by the policy server, a policy based upon the plurality of rules, wherein the policy defines electronic activity allowed at a managed device;
receiving, by the policy server, a further rule from a third party device;
determining, by the policy server, if third party rule submissions are enabled; and
in response to determining that the third party rule submissions are enabled,
validating the further rule to determine if the further rule is legitimate,
updating the policy based upon the further rule to obtain an updated policy, and
storing the updated policy at a policy repository;
detecting, by the policy server, an attempt to conduct the electronic activity, the attempt associated with the managed device;
identifying, by the policy server, the policy as being associated with the managed device;
identifying, by the policy server, a policy rule that is relevant to the electronic activity, wherein the policy rule is included in the updated policy; and
determining, by the policy server, if the policy rule permits the electronic activity based upon the variable and the value specified for the variable.

15. The method of claim 14, further comprising:
in response to determining that the policy rule does not allow the electronic activity,
generating a notification for a manager device; and
sending the notification to the manager device.

16. The method of claim 15, further comprising:
determining if an exception is received from the manager device;
in response to determining that the exception is not received, blocking the electronic activity; and
in response to determining that the exception is received, allowing the electronic activity,
determining if the updated policy is to be updated, and
updating the updated policy in response to determining that the updated policy is to be updated.

17. The method of claim 14, further comprising:
in response to determining that the policy rule allows the electronic activity, allowing, by the policy server, the electronic activity.

18. The method of claim 14, wherein validating the further rule comprises presenting the further rule to a manager device and receiving data indicating that the manager device approves the further rule.

* * * * *